United States Patent
Franck et al.

(10) Patent No.: US 6,603,674 B2
(45) Date of Patent: Aug. 5, 2003

(54) ELECTRONIC TRANSFORMER WITH GOOD IMMUNITY AGAINST HIGH-VOLTAGE PULSES

(75) Inventors: Felix Franck, Munich (DE); Helmut Haeusser-Boehm, Munich (DE); Joachim Muehlschlegel, Groebenzell (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 10/001,797

(22) Filed: Dec. 5, 2001

(65) Prior Publication Data

US 2002/0071299 A1 Jun. 13, 2002

(30) Foreign Application Priority Data

Dec. 13, 2000 (DE) .......................................... 100 62 047

(51) Int. Cl.⁷ .............................. H02M 3/24; H02M 5/45
(52) U.S. Cl. .............................. 363/97; 363/37; 315/224
(58) Field of Search .............................. 363/97, 98, 95, 363/37, 49, 39, 56, 132; 323/315, 277, 316, 905, 282; 315/224, 243, 244, 276, 205, 119

(56) References Cited

U.S. PATENT DOCUMENTS

| | | | | |
|---|---|---|---|---|
| 4,862,041 A | * | 8/1989 | Hirschmann | 315/246 |
| 5,099,407 A | * | 3/1992 | Thorne | 363/37 |
| 5,691,605 A | * | 11/1997 | Xia et al. | 315/307 |
| 5,740,021 A | * | 4/1998 | Lecheler et al. | 363/37 |

* cited by examiner

Primary Examiner—Rajnikant B. Patel
(74) Attorney, Agent, or Firm—Carlo S. Bessone

(57) ABSTRACT

Electronic transformers with a self-excited half bridge can be destroyed by high-voltage pulses from the mains supply lead. This can happen by the high-voltage pulse initiating a starting operation which leads to cross currents. This destruction mechanism is suppressed by specifically discharging a starting capacitor.

11 Claims, 5 Drawing Sheets

US 6,603,674 B2

ELECTRONIC TRANSFORMER WITH GOOD IMMUNITY AGAINST HIGH-VOLTAGE PULSES

TECHNICAL FIELD

The invention relates to electronic transformers, in particular those which are suitable for operating halogen incandescent lamps. The invention improves the immunity of the electronic transformer to high-voltage pulses.

PRIOR ART

Electronic transformers generally have the following design: the mains voltage supplied from the mains is firstly rectified. The rectified mains voltage supplies energy for an inverter. The inverter outputs a high-frequency voltage which can be transformed to the desired voltage with the aid of an output transformer. High frequency is understood in this context as frequencies which are substantially above the mains frequency. The prior art in this case comprises a frequency band from a plurality of kilohertz to over 1 megahertz. The application of electronic transformers for operating halogen incandescent lamps is very widespread. It is not necessary when operating these lamps to supply a constant voltage to the lamp. Because of the thermal inertia of the incandescent filament of these lamps, the voltage present across the lamp may be amplitude-modulated with the mains frequency. The capacitor, required for a constant output voltage, for energy storage can therefore be eliminated. However, this results in the following disadvantage: in accordance with regulation IEC 1047, an electronic transformer for halogen incandescent lamps must be immune to high-voltage pulses which are superimposed on the mains voltage and have an amplitude of 1000V. (The term surge resistance has become established for this in the literature, and will be used below.) It has emerged in practice that it is even desirable for the surge resistance to exceed the measure demanded in the standards. In principle, it is possible to use voltage-dependent resistors or semiconductors such as, for example, varistors or suppressor diodes against high-voltage pulses. However, it has emerged that these measures alone do not suffice to protect an electronic transformer against high-voltage pulses occurring in practice. Rather, todate it has been necessary to overdimension radio interference suppression filters and power transistors in order to achieve an adequate surge resistance.

SUMMARY OF THE INVENTION

It is an object of the present invention to provide an electronic transformer which in a cost effective fashion and with low outlay provides a surge resistance which satisfies at least the requirements of the relevant standards. The invention proceeds from an electronic transformer with a self-excited half-bridge inverter which includes a half-bridge with a series circuit of two electronic switches. Self-excited half-bridge inverters generally require a starting circuit which triggers a natural oscillation of the half-bridge inverter. This mostly occurs by virtue of the fact that an electronic switch of the half-bridge is driven for a short time by a starting capacitor. During the self-excited oscillation, it is necessary to suppress a starting operation by means of a blocking device, since otherwise it can occur that both switches of the half-bridge switch on simultaneously, and this leads to what are termed cross currents which destroy the half-bridge in a short time. The blocking device generally includes an electronic discharging switch which discharges the starting capacitor in a clock fashion through the half-bridge. In the case of electronic transformers which correspond to the prior art, the starting capacitor is always discharged whenever that switch of the half-bridge is conducting which is driven by the starting circuit upon triggering of the natural oscillation of the half-bridge. Precisely for this reason, however, the electronic transformer is sensitive to high-voltage pulses. Specifically, a high-voltage pulse penetrating into the electronic transformer via the mains terminal can have a destructive effect by charging the starting capacitor and therefore triggering a starting operation. This undesired starting operation causes no damage whenever the switch driven by the starting circuit is instantaneously switched on during the running natural oscillation. However, in the case of electronic transformers according to the prior art it is precisely when it is switched on instantaneously that the starting capacitor is discharged synchronously therewith and an undesired starting operation is suppressed. According to the invention, a starting operation is always, or even suppressed when the switch of the half-bridge is driven which is not driven during a starting operation. Consequently, an undesired starting operation triggered by a high-voltage pulse can drive only the switch of the half-bridge which is in any case instantaneously switched on. This avoids destruction of the electronic transformer by the above named cross currents.

The idea of the invention is realized by virtue of the fact that the electronic discharging switch included in the blocking device for discharging the starting capacitor is driven whenever, or even whenever precisely that switch of the half-bridge is driven which is not driven during a starting operation. This can be accomplished in a plurality of ways.

Self-excited electronic transformers often include a drive transformer which uses secondary windings to feed back an output variable of the half-bridge inverter onto the control electrodes of the switches for the half-bridge, the result being a self-excited oscillation. According to the invention, a further secondary winding is applied to this drive transformer. A drive signal for the electronic discharging switch included in the blocking device is generated via an electric network from the signal which is tapped at this further secondary winding. The sense of the further secondary winding is selected according to the invention such that this discharging switch is always driven when that switch of the half-bridge is driven which is not driven in the event of a starting operation. The different refinements for the said network are discussed in the description of the drawings.

A further embodiment of the idea of the invention consists in that a drive signal for the electronic discharging switch included in the blocking device is always generated when a high-voltage pulse occurs at the mains terminals. This can be achieved by virtue of the fact that the current activates the blocking device by means of a switching means which becomes conductive in the event of an overvoltage occurring at a voltage supply of the electronic transformer. An exemplary embodiment for this purpose is described in FIG. 7.

DESCRIPTION OF THE DRAWINGS

The aim below is to explain the invention in more detail with the aid of a plurality of exemplary embodiments.

In what follows, capacitors are denoted by the letter C, resistors by R, inductors by L, switches by S, transformers by T and diodes by D, followed in each case by a numeral.

Figure 1:
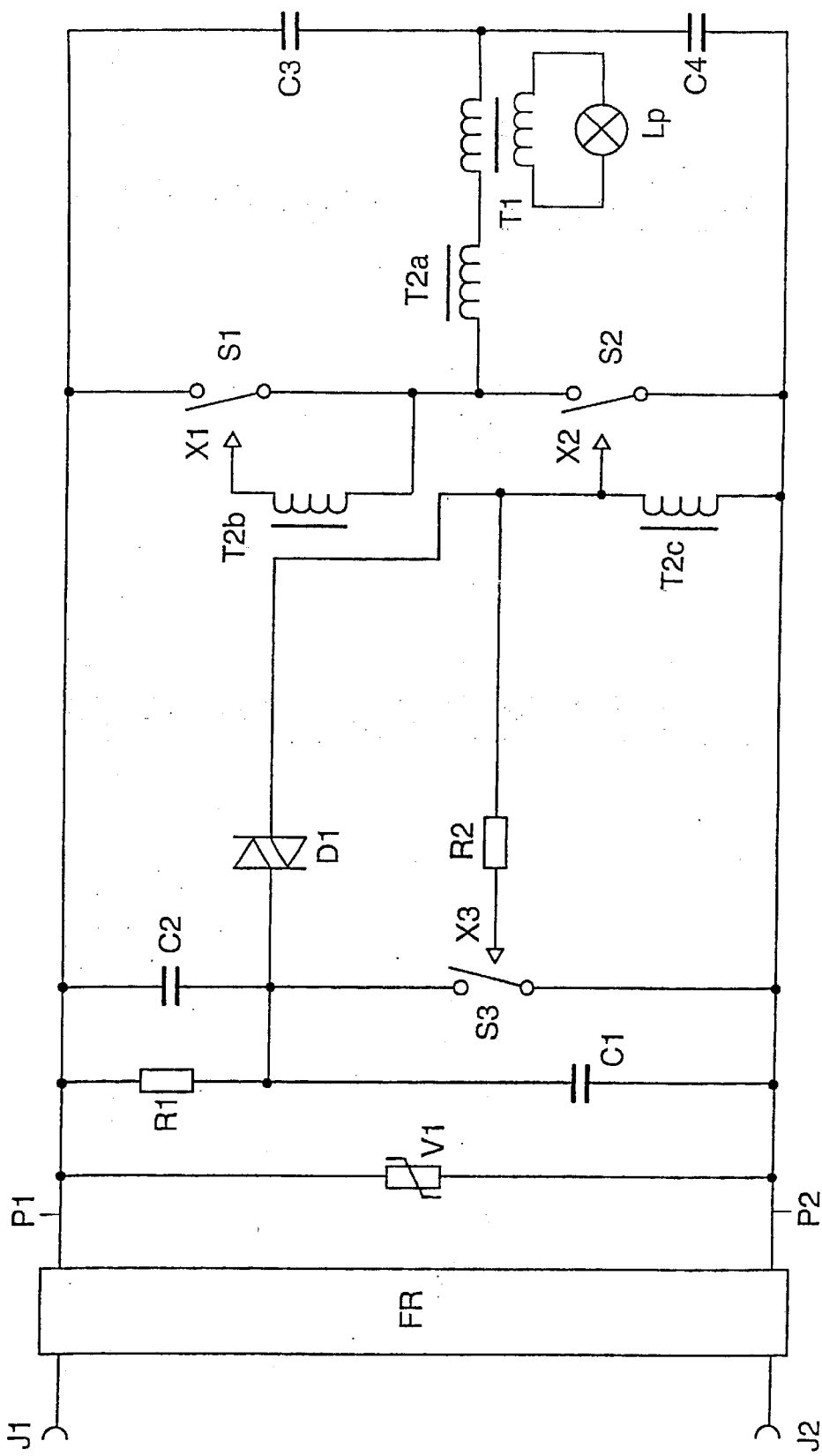
FIG. 1 shows a block diagram of an electronic transformer for operating halogen incandescent lamps, according to the prior art.

Illustrated in FIG. 1 is the block diagram of an electronic transformer as preferably used according to the prior art for halogen incandescent lamps. The mains voltage is fed by two terminals J1, J2 to a block FR which includes a radio interference suppression filter and a rectifier. Consequently, the rectified mains voltage is present between the potentials P1 and P2 at the output of the block FR. Connected between the potentials P1 and P2 is a varistor V1 which partially suppresses high-voltage pulses coupled in via the mains voltage. Instead of the varistor V1, it is also possible to use a suppressor diode or the like. The voltage between the potentials P1 and P2 feeds a half-bridge inverter. It includes a series circuit of two half-bridge switches S1 and S2, and a series circuit of two capacitors C3 and C4. Each of these series circuits is connected between the potentials P1 and P2. Only one of the two capacitors C3 and C4 is required for the half-bridge inverter function. S1 and S2 can be implemented by semiconductor switches such as a bipolar transistor, MOSFET or IGBT. The series circuit of the primary winding T2$a$ of a drive transformer and the primary winding of an output transformer T1 is connected between the connection point of S1 and S2 and the connection point of C3 and C4. The lamp Lp is connected to the secondary winding of T1. A first secondary winding T2$b$ of the drive transformer is connected to the control electrode X1 of the first half-bridge switch S1 and the connection point of S1 and S2. A second secondary winding T2$c$ of the drive transformer is connected to the control electrode X2 of the second half-bridge switch S2 and the potential P2. The sense of the windings of the drive transformer is selected so as to maintain an oscillation of the half-bridge.

The resistor R1 and capacitor C2 are connected to the potential P1. The respective other terminals of R1 and C2 are connected to one another. This connection point is connected to the potential P2 via the parallel circuit of the starting capacitor C1 and an electronic discharging switch S3. S1, S2 and S3 can be closed and opened respectively in each case by similar shape of a drive signal. The connection point of R1 and C2 is connected to the control electrode X2 of S2 via a Diac D1. The components R1, C1, C2 and the Diac D1 form a starting circuit. The voltage between the potentials P1 and P2 charges the starting capacitor C1 via R1 and C2. C2 serves to accelerate the charging operation by utilizing a rising voltage between the potentials P1 and P2. This acceleration can be used to improve the power factor of the electronic transformer. C2 can be omitted if this acceleration is not required. As soon as C1 is charged to the breakdown voltage of the Diac D1, D1 is switched on and thereby applies a drive signal to the control electrode X2 of S2. Thereupon, S2 closes, and the oscillation of the half-bridge is started.

The control electrode X3 of S3 is connected to the control electrode X2 of S2 via a resistor R2. S3 forms a blocking device together with R2. S3 is always driven via R2 when S2 is driven. Consequently, while the half-bridge is oscillating charging of the starting capacitor above the value of the breakdown voltage of the Diac D1 is prevented, and the starting circuit is thereby blocked.

Figure 2:
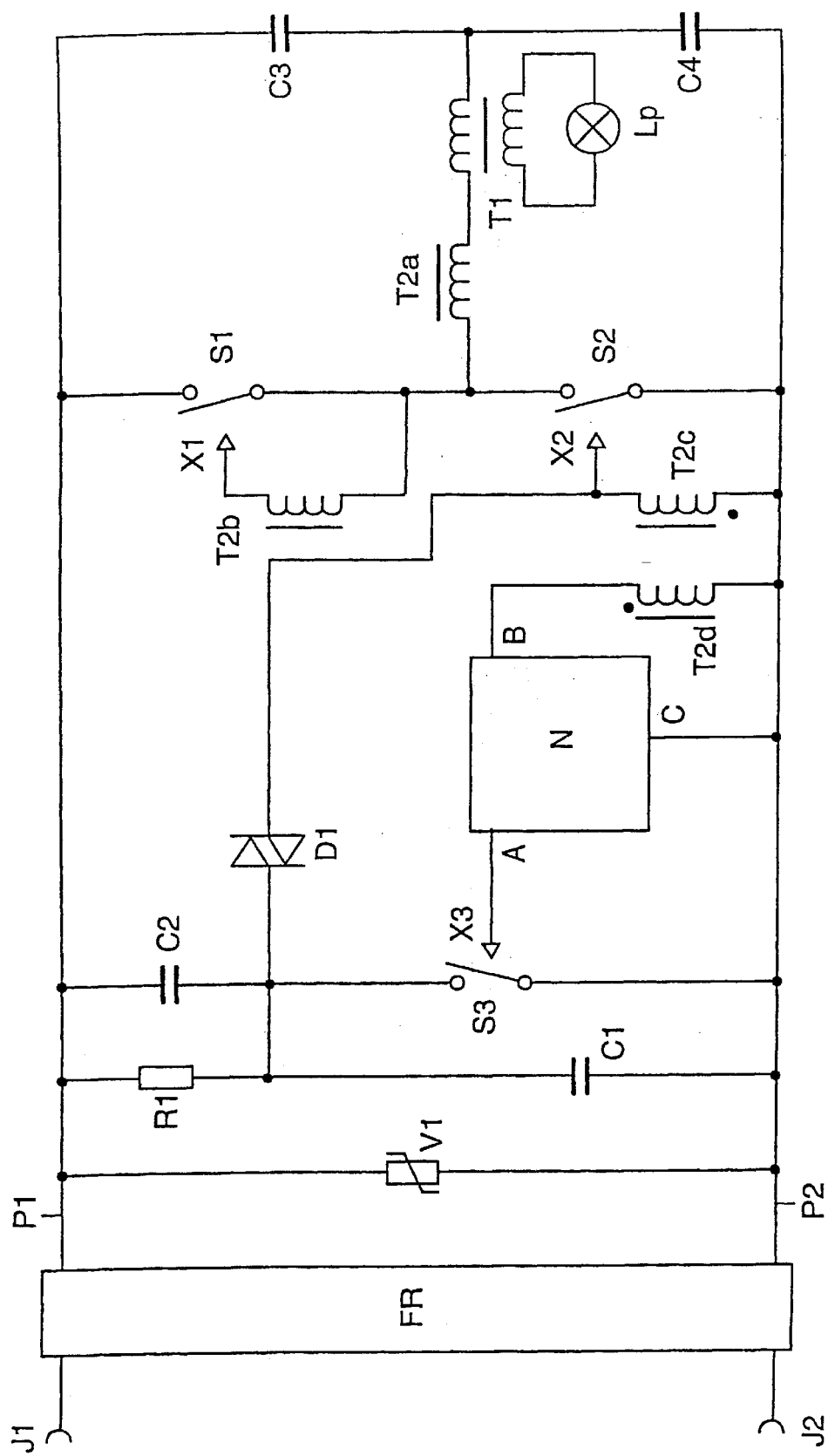
FIG. 2 shows a universal exemplary embodiment of the invention.

FIG. 2 shows a modification according to the invention of the block diagram according to FIG. 1. The following changes are undertaken: resistor R2, and thus the connection between the control electrodes X2 and X3, is removed. In addition, there is a network N with the terminals A, B and C. The terminal A is connected to the control electrode X3. The terminal C is connected to the potential P2. A third secondary winding T2$d$ of the drive transformer is connected between the terminal B and the potential P2. The sense of the secondary winding T2$d$ is inverted by comparison with the sense of the secondary winding T2$c$. Consequently, a signal is present at the control electrode X3 via the network N whenever no signal is present at the control electrode X2. This is to say, the blocking circuit is activated, or even activated according to the invention when the second half-bridge switch S2 is not driven. The network N serves the purpose of signal conditioning and is set forth more accurately in FIGS. 3–6.

Figure 3:
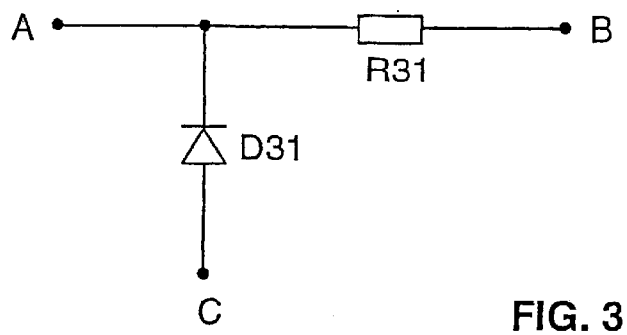
FIG. 3 shows a detail of an exemplary embodiment with reference to FIG. 2.

FIG. 3 shows an exemplary embodiment for the network N of FIG. 2. This is a particularly simple implementation. A resistor R31 is connected between the terminals A and B of the network N. Said resistor is necessary in order to keep as slight as possible the influence exerted by the blocking device on the drive of the half-bridge switches S1 and S2. A diode D31 is connected between the terminals A and C of the network N, the cathode of D31 being connected to terminal A. This diode can also be omitted, since it does not affect the core of the invention. It is advantageous when the discharging switch S3 of the blocking device is designed as a bipolar transistor. With the aid of the diode D31, the loading of the third secondary winding T2$d$ is then independent of the polarity of the voltage at this winding. The way in which the blocking device influences the drive of the half-bridge switches S1 and S2 is thereby balanced.

Figure 4:
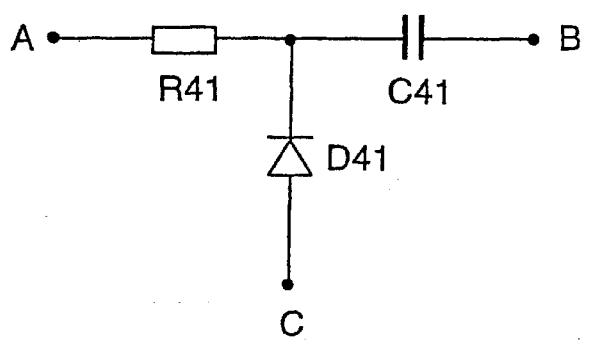
FIG. 4 shows a further detail of an exemplary embodiment, with reference to FIG. 2.

A further exemplary embodiment for the network N in FIG. 2 is illustrated in FIG. 4. The terminals A and B of the network N are connected by the series circuit of a resistor R41 and a capacitor C41, R41 being connected to the terminal A. The cathode of a diode D41 is connected to the connection point of R41 and C41. The anode of D41 is connected to the terminal C. By contrast with the arrangement in FIG. 3, the advantage of this arrangement consists in that use is made not only of the positive, but also of the negative component of the voltage supplied by the third secondary winding T2$d$. It is thereby possible to reduce the influence exerted on the drive of the half-bridge switches S1 and S2 by the blocking device. The potential P2 may be selected as reference potential for defining polarity.

Figure 5:
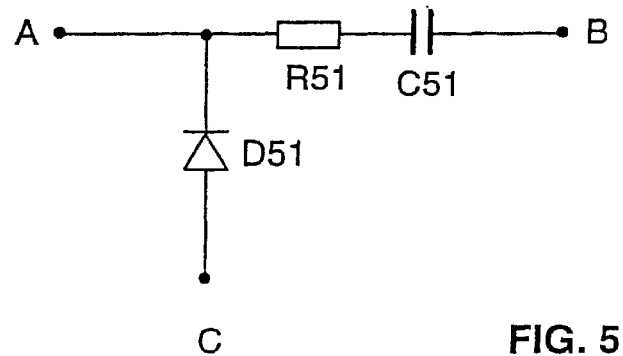
FIG. 5 shows a further detail of an exemplary embodiment, with reference to FIG. 2.

A further exemplary embodiment for the network N in FIG. 2 is illustrated in FIG. 5. The terminals A and B of the network N are connected by the series circuit of a resistor R51 and a capacitor C51, R51 being connected to the terminal A. A diode D51 is connected with the cathode to terminal A between terminals A and C. By contrast with the arrangement in FIG. 4, the advantage of this arrangement consists in that in the case of the use of a bipolar transistor for the discharging switch S3 loading of the third secondary winding T2$d$ is independent of the polarity of the voltage at this winding.

Figure 6:
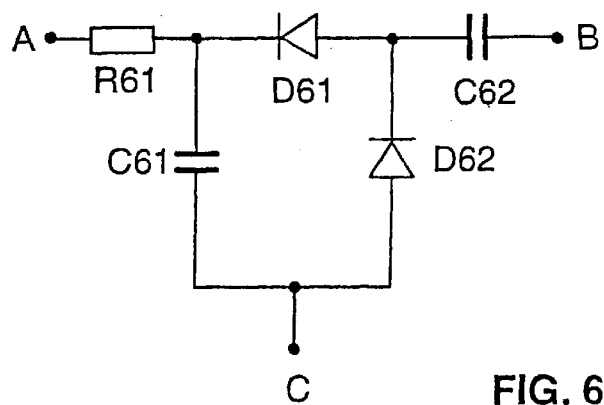
FIG. 6 shows a further detail of an exemplary embodiment, with reference to FIG. 2.

A further exemplary embodiment for the network N in FIG. 2 is illustrated in FIG. 6. The series circuit of a resistor R61, a diode D61 and a capacitor D62 is connected between the terminals A and B, R61 being connected to the terminal A, and C62 to the terminal B. The cathode of D61 points in the direction of terminal A. A capacitor C61 is connected between the connection point of R61 and D61 and the terminal C. Connected between the connection point of D61 and C62 and the terminal C is a diode D62 whose cathode is connected to the anode of D61. The advantage of this arrangement compared with the arrangements in FIGS. 3, 4 and 5 consists in that the discharging switch S3 can even be driven when the instantaneous voltage at the terminal B is negative. This is achieved by a hold circuit consisting of D61 and C61. The mode of operation of the hold circuit is as follows: if the voltage at the terminal B is negative by comparison with terminal C, D61 locks and C61 maintains the voltage at the terminal A for a certain time. In order to achieve driving of the discharging switch S3 even when the half-bridge switch S2 is being driven, it is also possible to install in the network N a double-way rectifier which undertakes double-way rectification of the voltage supplied by the third secondary winding T2d.

Figure 7:
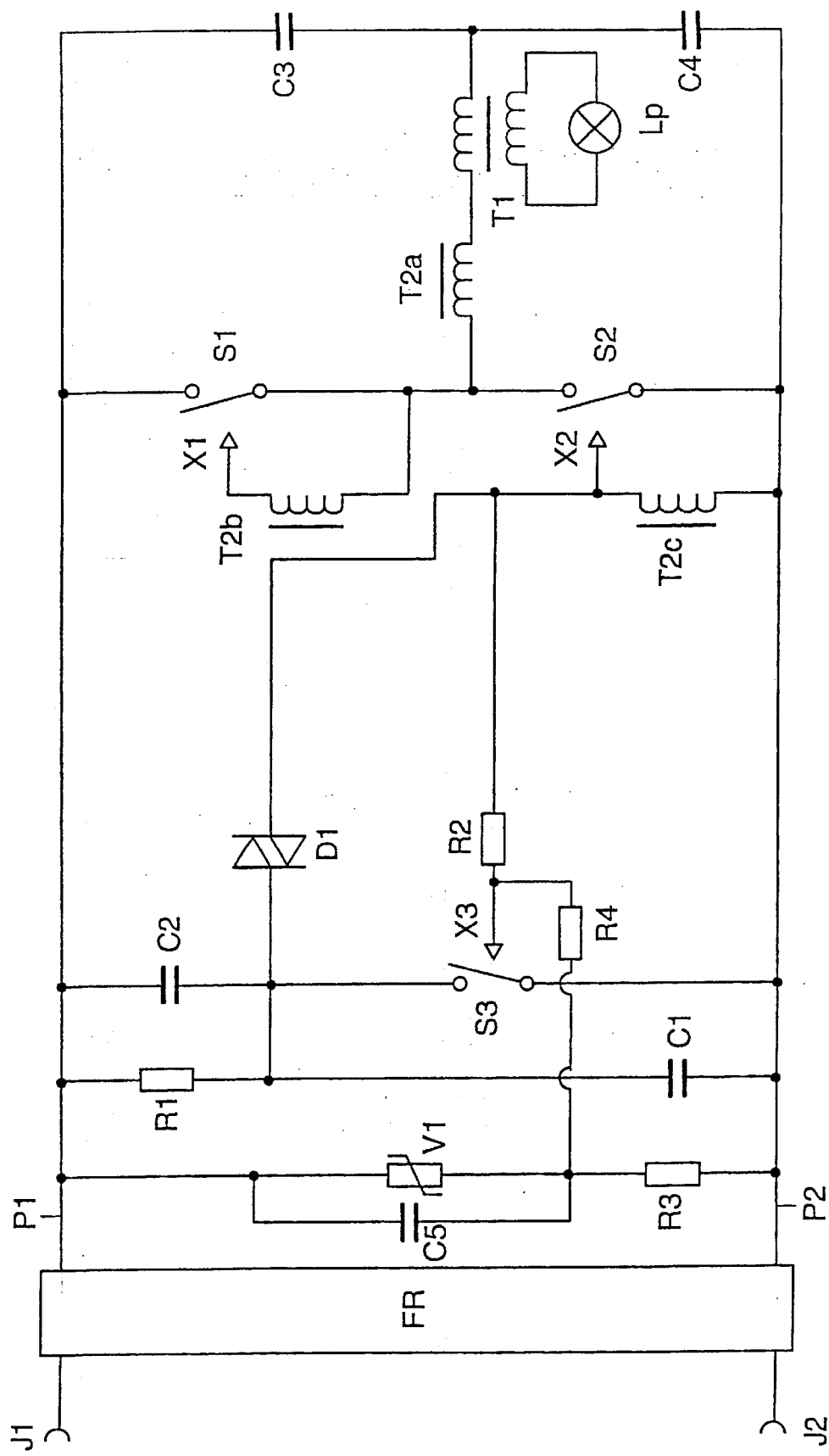
FIG. 7 shows a further exemplary embodiment of the invention.

FIG. 7 illustrates a way, differing from FIGS. 2–6, according to the invention of obtaining the drive signal for the discharging switch S3 of the blocking device. FIG. 7 deviates as follows from the prior art of FIG. 1. A capacitor C5 is connected in parallel with the varistor V1. Furthermore, the varistor V1 is connected to the potential P2 not directly, but via a resistor R3. The connection point of the varistor V1 and resistor R3 is connected to the control electrode X3 of the discharging switch S3 via a resistor R4. If a high-voltage pulse with a high amplitude and/or steep rising edge is fed in via the mains terminals J1, J2, a current flows through R3. According to the invention, the voltage drop caused thereby drives the discharging switch S3 and thereby activates the blocking device according to the invention even when the half-bridge switch S2 has not been driven.

Figure 8:
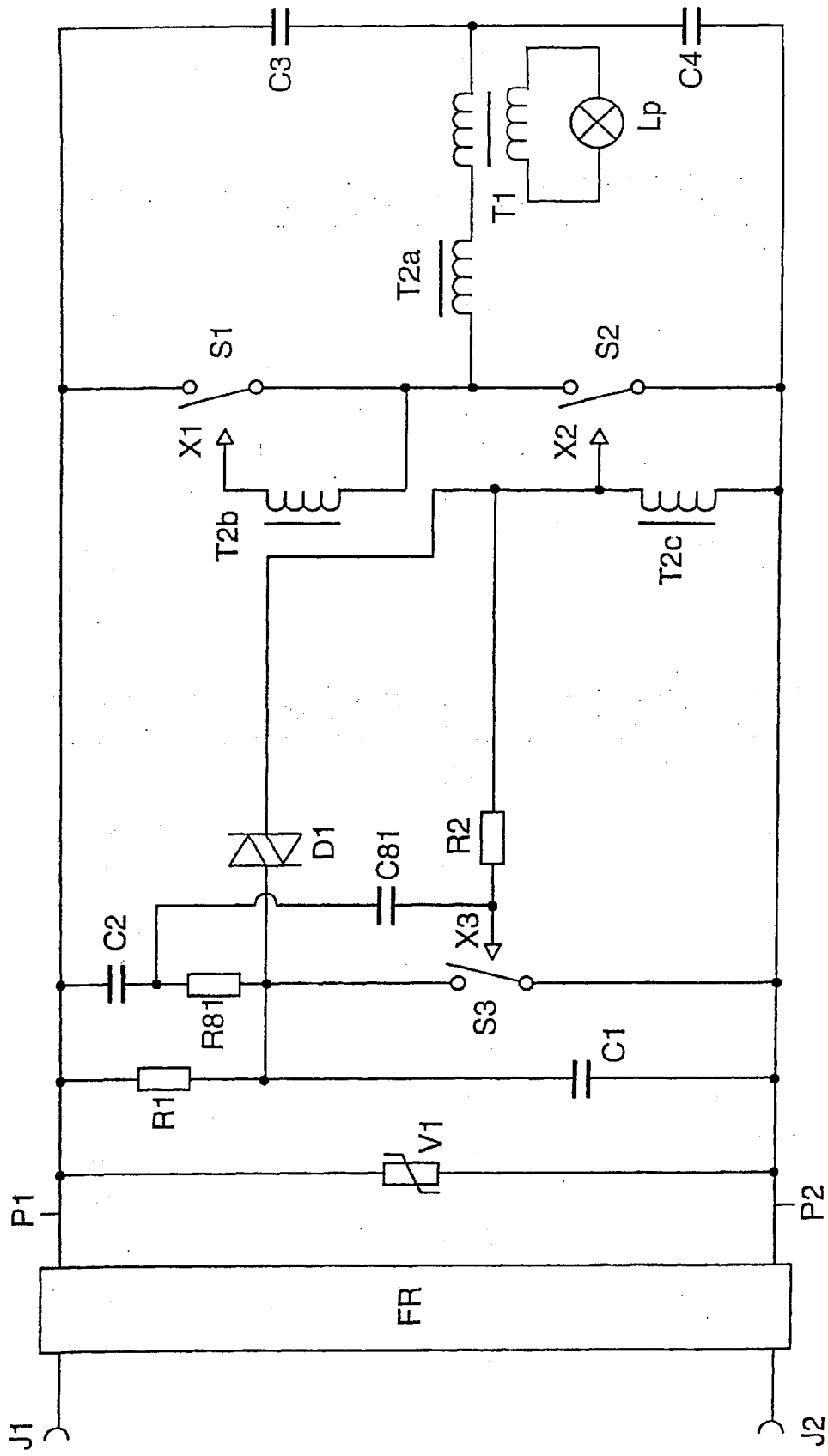
FIG. 8 shows a further exemplary embodiment.

FIG. 8 shows an exemplary embodiment of the invention in which, as in the exemplary embodiment of FIG. 7, the discharging switch S3 is driven according to the invention whenever a high-voltage pulse is present on the mains supply leads. According to the invention, a starting operation is therefore suppressed even when the switch of the half-bridge is being driven which is not driven in case of a starting operation. By contrast with FIG. 1, a resistor R81 is connected in series with the capacitor C2. Connected to the connection point of C2 and R81 is a capacitor C81 which makes a connection to the control electrode X3 of the discharging switch S3. If a high-voltage pulse with a high amplitude and/or steep rising edge is fed in via the mains terminals J1, J2, a current flows via C2 and C81 into the control electrode X3 and drives a discharging switch S3.

What is claimed is:

1. An electronic transformer comprising:
   a self-excited half-bridge inverter with a first (S1) and a second (S2) half-bridge switch,
   a starter circuit (R1, C1, C2, D1,) for driving the second half-bridge switch in order to start up the half-bridge inverter, and
   a blocking device for discharging a starting capacitor (C1) to prevent initiation of a starting operation b the starter circuit during operation of the half-bridge inverter, said blocking device includes switching means for discharging said starting capacitor (C1) when said second half-bridge switch (S2) of the half-bridge inverter is not driven.

2. The electronic transformer as claimed in claim 1 wherein self-excitation of the half-bridge inverter is performed by means of a drive transformer, said blocking device including an electronic discharging switch (S3) driven from a secondary winding (T2d) of a drive transformer, said secondary winding (T2d) having a winding sense such that said electronic discharging switch (S3) is driven when the second half-bridge switch (S2) is not driven.

3. The electronic transformer as claimed in claim 2 wherein said discharging switch (S3) is implemented by a bipolar transistor having base and emitter terminals, a diode (D51, D31) polarized to block when the discharging switch (S3) is driven is connected between the base and emitter terminals.

4. The electronic transformer as claimed in claim 2 wherein connected between said secondary winding (T2d) and said discharging switch (S3) is an electric network (N) which includes a series circuit of a resistor (R41, R51) and a capacitor (C41, C51).

5. The electronic transformer as claimed in claim 2 wherein connected between said secondary winding (T2d) and said discharging switch (S3) is an electric network (N) which outputs a DC voltage as drive for the discharging switch (S3) which corresponds approximately to a sum of positive and negative amplitudes of a voltage supplied by the secondary winding (T2d).

6. The electronic transformer as claimed in claim 2 wherein connected between said secondary winding (T2d) and said discharging switch (S3) is an electric network (N) which includes a hold circuit (D61, C61).

7. The electronic transformer as claimed in claim 2 wherein connected between said secondary winding (T2d) and said discharging switch (S3) is an electric network which includes a double-way rectifier.

8. The electronic transformer as claimed in claim 1 wherein the electronic transformer as switching means which become conductive when a high-voltage pulse occurs at a voltage supply of the electronic transformer, thus producing a current flow which causes at a resistor (R3) a voltage drop which activates said blocking device.

9. The electronic transformer as claimed in claim 8 wherein said switching means include a varistor (V1) which is connected in series with said resistor (R3), and a control signal (X3) for an electronic switch (S3) which is included in said blocking device is derived from a connection point between the varistor (V1) and resistor (R3).

10. The electronic transformer as claimed in claim 1 wherein the starting capacitor (C1) is connected in series with a second capacitor (C2) and a resistor (R81), and connected between the second capacitor (C2) and the resistor (R81) is a third capacitor (C81) via which a drive for the switching means of said blocking device is derived.

11. The electronic transformer as claimed in claim 1 wherein the electronic transformer operates a halogen incandescent lamp.

* * * * *